United States Patent Office 3,058,248
Patented Oct. 16, 1962

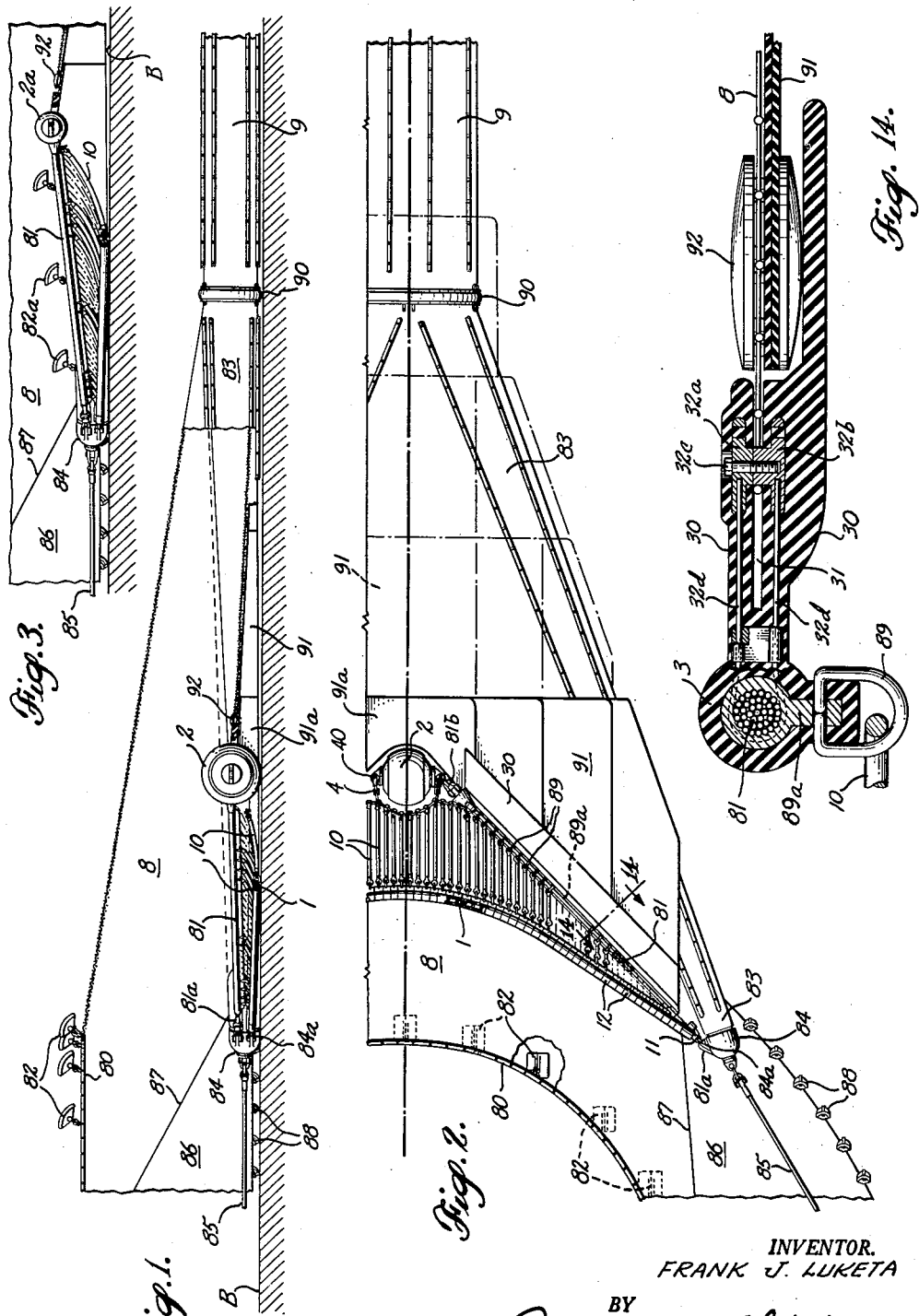

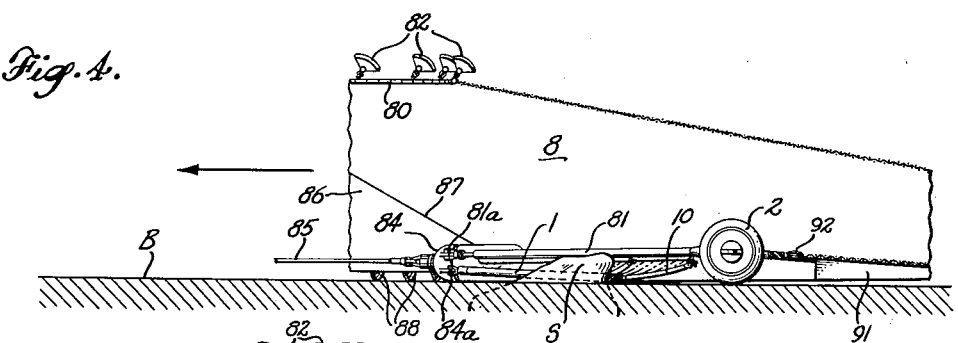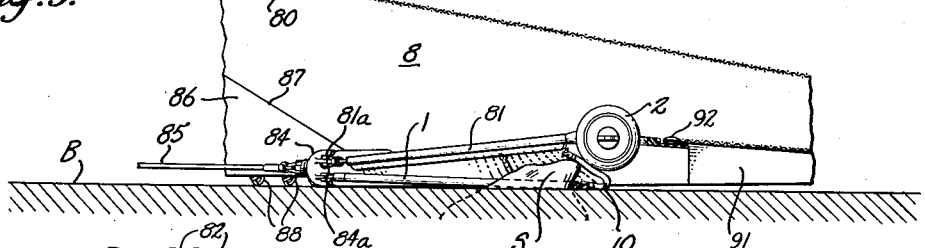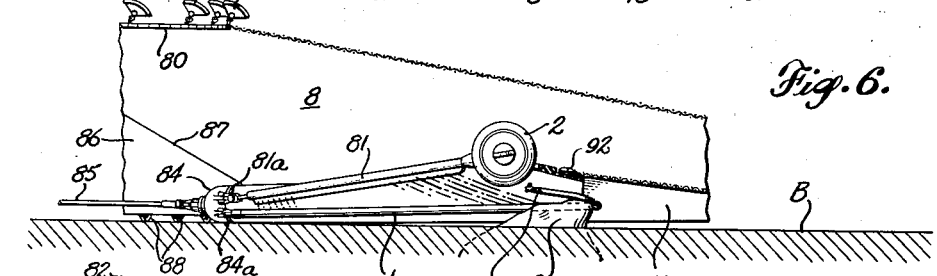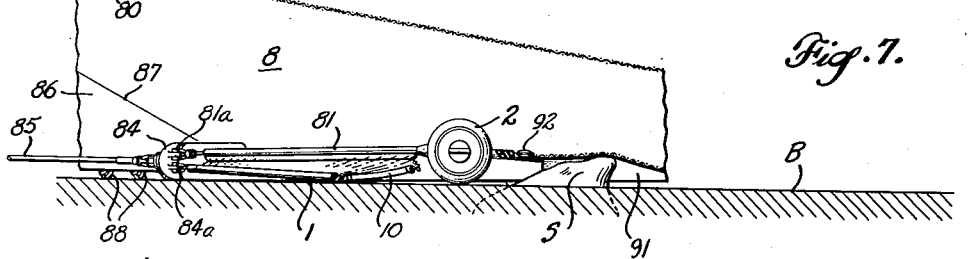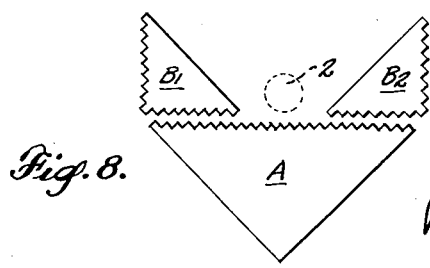

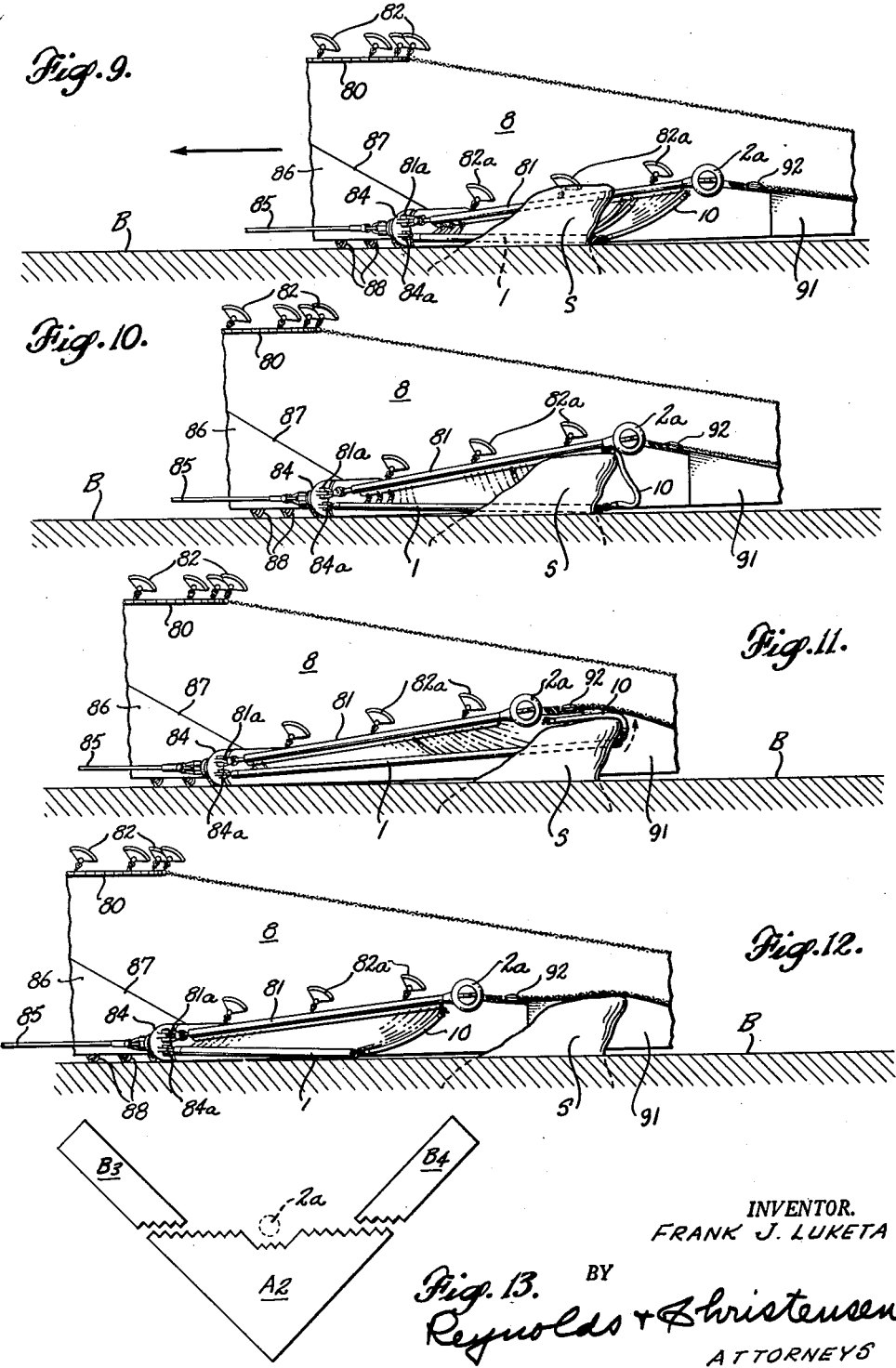

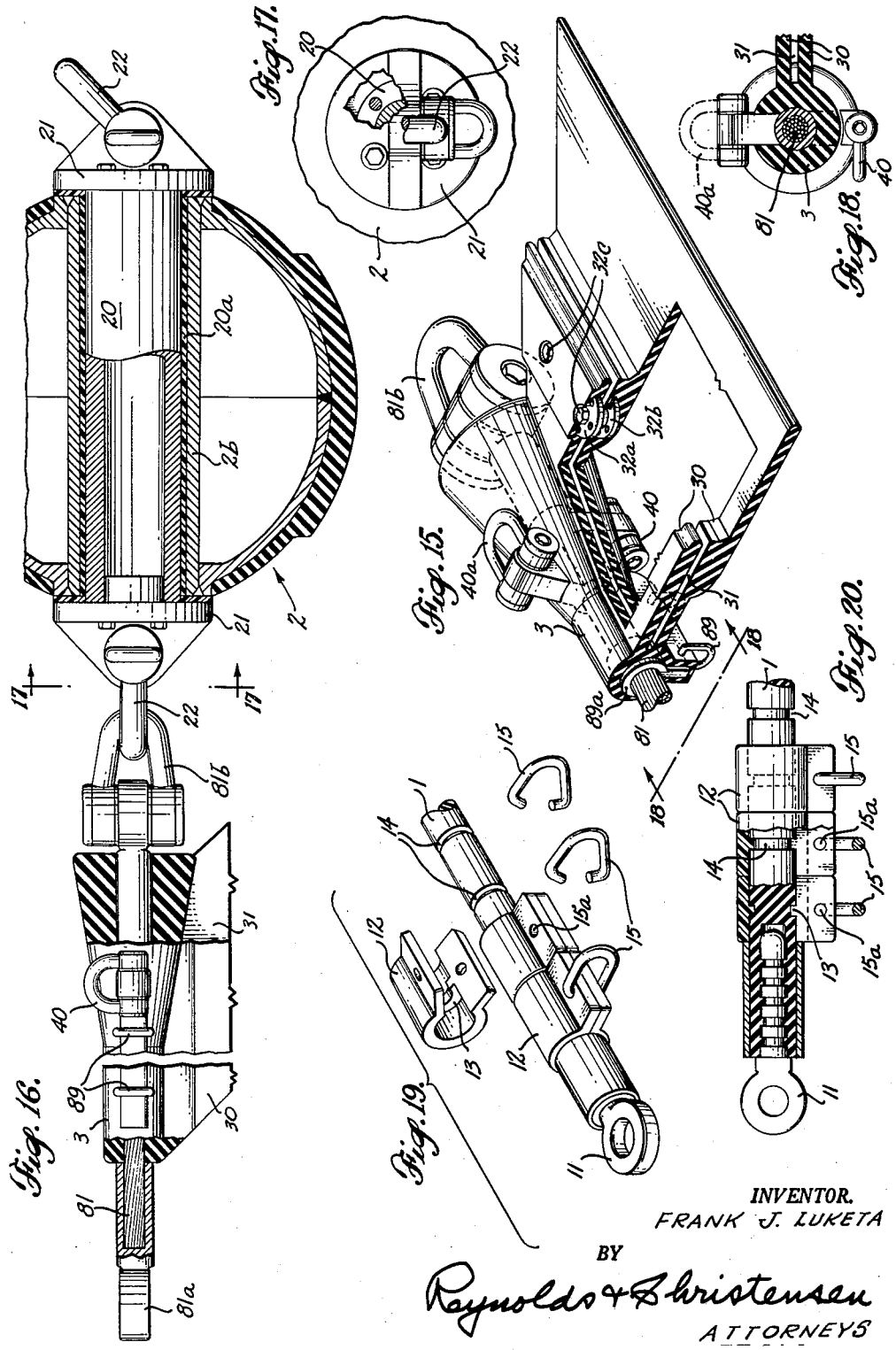

3,058,248
ELASTIC TICKLER FOR BOTTOM TRAWL NETS
Frank J. Luketa, 5567 Greenwood Ave., Seattle 3, Wash.
Filed Apr. 10, 1961, Ser. No. 102,014
13 Claims. (Cl. 43—9)

This invention relates generally to bottom trawl nets, as distinguished from midwater trawl nets. Bottom trawl nets drag along the bottom, and the lower bosom and the ground line across its edge must always remain close to if not actually on the bottom. In that location the ground line is subject to snagging upon upwardly projecting rocks or like obstructions. If in order to avoid some of these snags the ground line is buoyed up somewhat or is otherwise held up above the bottom, it may well pass above bottom fish, and these then escape entering the funnel leading to the codend. It is known practice to drag a transverse chain or tickler line along the bottom, just in advance of the ground line, to stir up such bottom fish. There still is the likelihood of snagging the tickler line and halting forward progress of the vessel and net.

The object of this invention is to provide a tickler construction which, although it drags the bottom, and so may become snagged, is self-releasing in almost all instances, and hence unlikely to snag damage, and will not by remaining snagged halt forward progress.

More particularly, it is an object of this invention to provide a tickler construction in which the transverse tickler line drags the bottom in advance of the ground line, but is elastic, so that it will yield if snagged. Release line interconnect the ground line, that is supported off the bottom, and the transverse tickler line, in such manner that before the elastic tickler line reaches its limit of elasticity the release lines will have pulled the tickler line automatically upwardly, off the snag, to free the tickler line. This action can be arranged to occur whether the ground line is of the type that is held up off the bottom by a single large bottom contacting bobbin, or is buoyed up a distance above the bottom by a single small buoyant bobbin plus planing floats, for in all cases the ground line is held off the bottom. In either case the tickler and the release lines cooperate to constitute a barrier that blocks escape of fish beneath the oncoming bosom, and guides them into the funnel.

It is also an object to provide constructions which afford ease and rapidity of replacement of release lines if necessary.

Other objects, especially such as relate to details of construction, will become apparent as this specification progresses.

The invention is illustrated in two forms, in one of which a large bobbin rolls along the bottom and supports the ground line close to but still off the bottom, and in the other of which the ground line is buoyed up by planing floats and a buoyant bobbin well above the bottom.

FIGURE 1 is in part a side elevation and in part a vertical longitudinal section through a net embodying the invention, and employing a non-buoyant rolling bobbin to elevate the ground line off the bottom.

FIGURE 2 is a bottom or "clam's-eye" view of the same.

FIGURE 3 is a view similar to FIGURE 1, but employing buoyant float means to elevate the ground line.

FIGURES 4, 5, 6 and 7 are views similar to FIGURE 1, illustrating successive steps in the snagging and release of the tickler, in the case where a rolling bobbin is employed on the ground line.

FIGURE 8 is a layout of the net panels that constitute the lower portion of the funnel, when a rolling bobbin is used.

FIGURES 9, 10, 11 and 12 are views corresponding to FIGURES 4 to 7, inclusive, showing successive steps in the snagging and release of the tickler, in the case where the ground line is buoyed up above the bottom.

FIGURE 13 is a layout of the net panels that constitute the lower portion of the funnel, when floats are used to buoy up the ground line.

FIGURE 14 is a detail sectional view, at the line 14—14 of FIGURE 2, showing the manner in which a release line is anchored to the ground line, and the relationship of the latter to the meshes of the funnel and to the chafing gear.

FIGURE 15 is an isometric view of the same, partly in section, at the point where the ground line joins the bobbin.

FIGURE 16 is a sectional view along the ground line and through the rolling bobbin, viewed from below.

FIGURE 17 is a detail end view, partly broken away, of an anchorage for the ground line at one end of the rolling bobbin, the point of view being indicated by the line 17—17 of FIGURE 16.

FIGURE 18 is a sectional view, at the line 18—18 of FIGURE 15 transversely of the ground line, at an anchorage to the bobbin.

FIGURE 19 is an exploded isometric view of anchorages for the release lines to the elastic tickler line, and FIGURE 20 is in part an elevation and in part an axial section of the same.

A bottom trawl net of a preferred construction includes a funnel of mesh generally designated by the numeral 8, which diverges forwardly and laterally, and somewhat in the vertical direction, from a rigid expander ring 90 that defines the forward entrance to a codend 9, closed at its after end. The upper bosom of the funnel is defined by a transverse float line 80 which lies ahead of its lower bosom, defined by the rubber encased cable that constitutes the ground line 81. Float line 80 is buoyed up by planing floats 82, and the ground line is supported close to but somewhat off the bottom B by a large diameter rolling bobbin 2 (also rubber-encased, as seen in FIGURE 16) or by a buoyant and usually somewhat smaller bobbin 2a (see FIGURES 9 to 12), either of which in effect is incorporated in and between the ends of the ground line 81. In the latter version planing floats 82a distributed along the ground line assist in holding it elevated somewhat above the bottom. The net of preferred construction also incorporates two suspenders 83, as disclosed in my application entitled Large Capacity Midwater Trawl Net, Serial No. 80,170, filed January 3, 1961, of heavy mesh which close the opposite side walls of the funnel and together encompass the opening defined by the expander ring 90 at their after ends, and which each converge to a connector 84 at their forward end, to which a sweep line 85 is anchored, extending thence forwardly and divergently to doors (not shown). The doors are towed by towing warps from the trawler, and their function is to spread widely apart the forward ends of curtains 86 which at their after ends are laced at 87 to the side edges of funnel 8, to lead fish into the latter. The suspenders take and distribute to the codend the entire pull of the towing warps. The curtains hang from curtain lines (not shown) that constitute forward extensions of the float line 80, and their free lower edges are held to the bottom B by weights or planing depressors 88.

The outer ends of ground line 81 are anchored at 81a to the connector 84, and assuming that but one large bobbin 2 is employed, the ground line at its center incorporates and supports a shaft 20 whereon the ball-like bobbin is journaled. A flanged cap 21 is secured at each end of the hollow shaft 20, and is formed with an eye to which a clevis 22 is pivoted. Anti-friction bearing material of nylon 20a is interposed between the core 2b of bobbin 2 (or 2a) and shaft 20, to enable easy turning of the bobbin. A clevis 81b secured to the inner terminus of each half of the ground line 81 engages with clevis 22, and so the two halves of the ground line are joined by the shaft 20 across the lower bosom. The construction when a buoyant bobbin 2a is used is similar.

The forward mesh edge of the lower funnel panel is secured at frequent intervals to the ground line. A convenient construction to this end is shown in FIGURE 14. A tough molded rubber casing 3 surrounds the ground line, and a rearward extension 30 is slit horizontally from its after edge to leave a groove 31 which the mesh edge of the lower panel of the funnel 8 may enter. Stud halves 32a and 32b in the respective upper and lower portions, held together by bolts 32c, constitute the releasable anchorages for the mesh edge. These stud halves are themselves swaged to the ends of fine cables 32d that encircle the ground line 81. Chafing gear 91, of rubber, underlies the funnel and codend, and is anchored at 92, and the extension 30 extends far enough to the rear to underlie the anchorages 92.

The interposed bobbin 2 interrupts the securement of the forward edge of the mesh to the ground line, but the mesh still is secured to the studs 32a, 32b supported within the extension 30.

Since it is evident that the ground line 81 will be raised somewhat above the bottom B by the rolling bobbin 2 or by the buoyant bobbin 2a, and by the floats 82a, a tickler construction must be employed to drag over the bottom immediately ahead of the ground line; it must also form a wall depending from the elevated ground line to the bottom, and, because anything dragging the bottom will of necessity encounter snags upstanding from the bottom, it must either be inherently non-snagging or must be self-releasing. The tickler construction of this invention is designed to be self-releasing.

The tickler line 1 is elastic, and when unstretched it extends from one connector 84 across to the other in advance of the ground line 81. Its ends 11 are anchored to the connectors at 84a, in much the same manner that the ground line is anchored. Whereas the ground line is inelastic, the tickler line is wholly of elastic rubber, and can stretch materially. Inelastic release lines 10 extend in the direction of advance between the tickler line 1 and the ground line 81. They are of lengths such that when the tickler line is unstretched the release lines extend nearly straight, and are parallel to one another, and thus together they constitute a barrier closing any gap between the bottom-engaging tickler line 1 and the elevated ground line 81, and direct fish which the tickler line stirs off the bottom over the ground line and into the funnel, eventually to enter the codend.

The preferred anchorage for the ends of the release lines includes a series of clamps 12, preferably of nylon, for the tickler line end of each release line, and a somewhat similar construction for the ground line end of the same. Each clamp 12 is circumferentially flanged inwardly of its bore that receives the tickler line 1, as shown at 13. The tickler line is circumferentially grooved at 14 at intervals that correspond to the length of clamps 12, and the flanges 13 are received in the grooves 14. Pinch rings or eyes 15 engage in holes 15a of the clamps 12, and hold the latter closed, besides constituting an anchorage for the one end of a release line. The other end of the release line is anchored to a similar pinch ring or eye 89, secured to a flange 89a depending from the cable core of ground line 81. This flange 89a need not be in short sections for the same reason as are the clamps 12, although for flexibility in the ground line they would be of sectional construction. The individual short nylon clamp sections 12 enable the tickler line to stretch and still to space the barrier-forming release lines to remain equally spaced apart. This equal spacing of expendable, easily replaceable clamps 12 protects the tickler line against material chafing, even when the tickler line is stretched to the maximum, as will now be explained.

In trawling, as FIGURES 4 to 7 and 9 to 12 show, the large rolling bobbin 2 or the buoyant bobbin 2a and the floats 82a hold the ground line elevated a certain distance above the bottom. If, however, the bottom-dragging tickler line 1 in advance of the ground line encounters an upstanding snag S it may catch thereon, as in FIGURES 4 and 9. The large bobbin 2 or the buoyant bobbin 2a rolls or floats over the snag, the tickler line 1 meantime stretching, as in FIGURES 5 and 10. Eventually the release lines extend aft from the ground line 81 to the snagged but elastic tickler line 1, instead of forwardly, and tension from the ground line which is strongly anchored at its ends to the connectors 84 pulls the inelastic release lines 10, and certain of these in turn, passing over the snag S, pull upwardly on the tickler line 1 (FIGURE 6 or 11) until the latter is lifted over the snag. Its elasticity then restores it to normal length, status, and position, ahead of the ground line (FIGURES 7 or 12) and normal functioning of all parts resumes.

The lower net panels of the funnel must be cut to conform to the presence of the bobbin 2 or 2a. In FIGURE 8 three triangular panels A, B1 and B2 are used. Panel A is bar cut along its two outer edges, and its forward edge is point cut. The divergent edges of panels B1 and B2 are bar cut, and their other two edges are point cut, and are woven to the point cut forward edge of panel A. The suspenders 83 are laced to the outer edges of the composite bottom panel thus formed, and the reentrant edges are anchored, in the manner already described, to the ground line. In FIGURE 13 three panels are also used, but each is of different form. Panel A2 is nearly the same as panel A, although notched in its forward edge to receive the smaller bobbin 2a. Panels B3 and B4 are bar cut along all their edges except the edge that is to be woven to panel A2. Again, the suspenders are connected along the outer edges of the composite panel, and the ground line engages the reentrant edges thereof.

To support the rear ends of release lines which are ahead of the bobbin 2 or 2a, a line 4 extends from eyes 40 at the sides of the bobbin, and which are secured to the ground line 81. The after ends of these release lines are anchored to line 4 in a manner similar to that already described. Shackles 40a provide anchorage for the chafing gear panel 91a behind the bobbin.

The anchorages at 81a and 84a, and at 81b, enable easy removal and replacement of a damaged ground line or tickler line. The release line anchorages at 15 and at 89 simplify their disengagement when necessary. The securement at 32a, 32b, and 32c enables quick disengagement and replacement of funnel panels. The stress of disengaging a snagged tickler line is borne by a large number of release lines, and is not concentrated on one such line alone. All parts, except the large bobbin, are rather small, and offer no obstruction to winding the entire net onto a drum, in employing the drum trawling method.

Bobbins have been used heretofore on trawl nets, but always, so far as I am aware, in multiple, up to as many as twenty or more, across the lower bosom. This mass of heavy, bulky bobbins interferes with hauling in of the net, and precludes hauling by the drum trawling method wherein the net and its attachments (including the bobbins) must be wound upon a drum. This is the first trawl net known to me which can operate using a single bobbin, and hauling by the drum trawling method is entirely feasible. The bobbin of this invention, whether of the rolling type 2 or the buoyant type 2a, will clear almost any snag in its path, of whatever height, if the snag slopes upwardly in the direction of drag, and even if the snag slopes reversely, as do those illustrated at S, the rolling bobbin will roll over any snag that projects above bottom slightly less than the radius of the bobbin. The single small buoyant bobbin 2a will clear a snag of even greater height. In either case the single bobbin is adequate to enable the lower bosom of the net to clear most snags, and to clear the tickler line automatically from such snags if the bosom itself clears.

I claim as my invention:

1. In combination with a bottom trawl net which includes a funnel, a ground line extending across the lower bosom of the funnel, means to lift the ground line over snags of a given height which stand up from the bottom, an elastic bottom-dragging tickler line extending across the net in advance of the ground line, when said tickler line is relaxed, but sufficiently elastic to extend behind the ground line if the tickler line is snagged, and means interconnecting the tickler line and the ground line to transmit tension from the latter to the former when the tickler line is snagged and so stretched.

2. The combination of claim 1, including a bobbin incorporated intermediate the ends of the ground line, and constituting at least a part of the means to lift the ground line over snags.

3. The combination of claim 2, including float means intermediate the bobbin and the ends of the ground line, constituting additional means to lift the ground line.

4. The combination of claim 2, wherein the bobbin is non-buoyant, to roll over the bottom.

5. The combination of claim 2, wherein the bobbin is buoyant, and the height of the ground line above bottom is governed by the tension-transmitting means.

6. The combination of claim 2, including a single bobbin only, incorporated substantially at the midpoint of the ground line.

7. The combination of claim 1, including a plurality of inelastic release lines extending between the tickler line and the ground line, in fore-and-aft parallelism, and constituting the tension-transmitting means.

8. The combination of claim 7, including a plurality of elements encircling and engaged at regularly spaced intervals with the elastic tickler line, to be thereby held closely spaced when the tickler line is relaxed, and each constituting the anchorage for an end of a release line, said elements being spaced at regular but greater intervals when the tickler line is stretched.

9. The combination of claim 8, wherein the tickler line is circumferentially grooved at the regular intervals, and wherein each anchorage element comprises a clamp encircling the tickler line, and an inwardly directed flange on each clamp received within its groove about the tickler line, to maintain the spacing between clamps.

10. The combination of claim 9, including a pinch ring engageable with each clamp, and constituting the anchorage for one end of the corresponding release line.

11. The combination of claim 10, including flanged elements secured to the ground line, and pinch rings engageable with the flange of said elements to constitute the anchorage for the other end of the several release lines.

12. The combination with a bottom trawl net which includes a funnel, a ground line extending across the lower bosom of the funnel, means to support said ground line, in use, somewhat above the bottom, an elastic tickler line extending across the net, and when relaxed being of a length to drag the bottom in advance of said ground line, and inelastic tension-transmitting means interconnecting the tickler line and the ground line, to transmit a pull from the ground line to the tickler line when the latter is snagged and stretched behind the ground line.

13. In combination with a bottom trawl net including a funnel having a lower bosom and a codend dragging behind the funnel, into the entrance of which the funnel opens, a suspender at each side of the funnel, the after end of which suspenders being distributed about the codend's entrance, a connector for each suspender, to which its forward end converges and is secured, and for attachment of a sweep line, an inelastic ground line joining the connectors at opposite sides and secured along the lower bosom, means to elevate the ground line somewhat above the bottom, a tickler line of elastic material also joining the connectors, and when relaxed being spaced ahead of the ground line, and a plurality of inelastic release lines extending fore and aft between the tickler line and the ground line at closely spaced intervals.

References Cited in the file of this patent
UNITED STATES PATENTS

| 2,100,160 | Dahl et al. | Nov. 23, 1937 |
| 2,414,055 | Miller | Jan. 7, 1947 |
| 2,890,542 | Willingham | June 16, 1959 |

FOREIGN PATENTS

| 21,260/29 | Australia | Jan. 28, 1930 |
| 123.373 | U.S.S.R. | Apr. 8, 1960 |